Oct. 12, 1937.  M. G. SWENSON  2,095,535
ARTIFICIAL TOOTH
Filed Feb. 11, 1936

INVENTOR
Merrill G. Swenson
BY
his ATTORNEYS

Patented Oct. 12, 1937

2,095,535

UNITED STATES PATENT OFFICE 2,095,535

ARTIFICIAL TOOTH

Merrill G. Swenson, New York, N. Y.

Application February 11, 1936, Serial No. 63,321

2 Claims. (Cl. 32—10)

This invention relates to an anterior artificial tooth designed for mounting in a denture, and has for an object to provide such a tooth which is adapted for firm union with the base material of the denture so as to have great resistance to biting strains in all directions.

Another object is to provide a tooth of this character that has a complete lingual surface which furnishes a bulk of porcelain placed so as to prevent dislodgement of the tooth and furnish additional strength as well as natural appearance and feeling to the tongue; which tooth also has a labial surface with an abundance of overlap at the upper portion.

Another object is to provide a tooth of this character that dispenses with the necessity of using a pin or the like as a fastening element, the union with the base material of the denture being accomplished by the shape of the tooth.

Another object is to provide a tooth of this character in which the portion that is adapted to be set in the base material of the denture is so formed as to provide depressions or retention pits for the base material, which are so shaped as readily to accommodate the flow of the base material in the manufacture of the denture, and are of such size as to afford an abundance of strength in the union of tooth and base material.

Another object is to provide a tooth of this character that is less expensive to manufacture than the anterior tooth heretofore provided with fastening pins.

Another object is to provide a tooth of this character in which the porcelain distribution is so arranged as greatly to increase the strength of the tooth with relation to the forms of pin tooth heretofore in use.

Another object consists in providing a tooth of this character which is so shaped as to adapt itself readily to close and accurate location with respect to the edentulous ridge or gum.

A further object is to provide certain improvements in the form, construction, and arrangement of the tooth whereby the above named and other objects may effectively be attained.

A practical embodiment of the invention is represented in the accompanying drawing in which.

Figure 1:
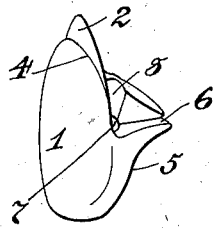
Fig. 1 represents a perspective view of the tooth detached from the denture.
Figure 2:
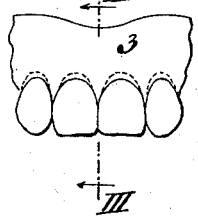
Fig. 2 represents a detail front elevation, on a smaller scale, showing four of the teeth set in the base material of the denture.
Figure 3:
Fig. 3 represents a vertical section taken in the plane of the line III—III of Fig. 2 looking in the direction of the arrows.
Figure 4:
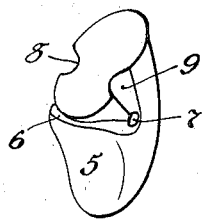
Fig. 4 represents a perspective view of the detached tooth, on the scale of Fig. 1, and in a position differing from Fig. 1.
Figure 5:
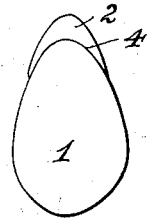
Fig. 5 represents a front elevation of the detached tooth, on the same scale.
Figure 6:
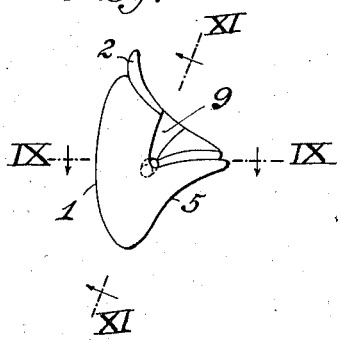
Fig. 6 represents a side elevation of the detached tooth, on the same scale.
Figure 7:
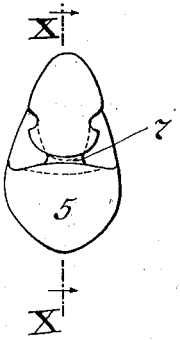
Fig. 7 represents a rear elevation of the detached tooth, on the same scale.

The front or labial side of the tooth is denoted by 1, and it is cut away at its upper portion to provide a flange or extension 2 that is fitted to enter the base material 3 of the denture to form an anchorage therein, as indicated by the dotted lines in Fig. 2. This cutting away of the front of the tooth to form the flange 2 makes a crease at the junction of the flange and labial surface, which crease is marked 4, and serves fittingly to receive the flow of the base material during manufacture of the denture, so as to accomplish a smooth and natural appearing union of the parts at this point.

The flange 2 extends some distance vertically upwardly beyond the labial surface of the tooth, and gradually tapers and decreases in width as it progresses downwardly on each side of the tooth.

The lingual surface of the tooth is marked 5 and it is of an extent comparable to that of a natural tooth so as to constitute, in effect, a complete lingual surface.

Figure 9:
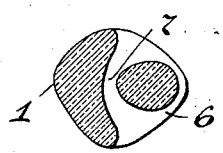
Fig. 9 represents a horizontal section, taken in the plane of the line IX—IX of Fig. 6, looking in the direction of the arrows.
Figure 8:
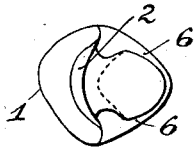
Fig. 8 represents a top plan view of the detached tooth, on the same scale.
Figure 10:
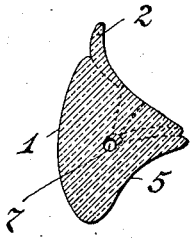
Fig. 10 represents a vertical section taken in the plane of the line X—X of Fig. 7, looking in the direction of the arrows.
Figure 11:
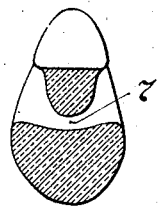
Fig. 11 represents a section taken in the plane of the line XI—XI of Fig. 6, looking in the direction of the arrows.

At the top of the lingual surface, the tooth is cut away to form a shoulder 6 that extends not only across the lingual surface but forwardly toward the central vertical axis of the tooth. As this shoulder 6 progresses forwardly on each side of the tooth it grows wider, as well shown in Figs. 8 and 9 of the drawing, until finally it develops into a transverse passage 7 that extends through the tooth at a point adjacent the coincidence of its vertical and horizontal axes.

Each side of the tooth is also provided with a vertical groove 8, 9, that extends away from the base of the tooth until it meets the shoulder 6 at the point where the said shoulder unites with the transverse passage 7. That portion of the tooth to the front of the grooves 8, 9 may, for the sake of convenience, be referred to as the labial portion, and that portion to the rear of said grooves may be referred to as the lingual portion.

The said grooves 8, 9 converge toward each other as they progress downwardly, and the result of the shape and relative location of the shoulder 6 and grooves 8, 9 is such as to form, at each side of the tooth, an inwardly and downwardly tapered depression or pit which merges into the transverse passage 7 to form retention points or anchorages for the base material of the denture.

This formation of the tooth just detailed also provides a base surface that is substantially flat, though concave in side view, with undercut surrounding edges that are broken or indented, in plan view, by the upper extremities of the grooves 8, 9. The undercutting serves to reduce the area of the base portion so as to leave the lingual and labial surfaces extending therebeyond in a horizontal direction. This formation constitutes a means for accomplishing extremely firm union of the tooth and the base material of the denture, while adapting the tooth to satisfactory use in the full range of conditions found in practice. It will be seen that the shape of the tooth lends itself to ready flowing of the base material, when in the mold or flask and under heat, into the creases, grooves, depressions, or pits, so that the base material will grip the tooth with extraordinary rigidity. The base material is adapted, even, to flowing into both sides of the passage 7, and to fill the same so as to constitute endless base material reaching from one side to the other through the tooth. The small size of the passage 7, and the flared formation at each end thereof prevents the trapping of any substantial amount of air which might hinder the union of the base material flowing in from both sides.

The setting of teeth embodying this invention in a denture may be accomplished in any well known and approved manner and, as such procedure is familiar to those skilled in this art, there seems no occasion for describing it.

When suitably set in a denture, teeth embodying this invention have a very natural appearance, a very pleasing surface for contact with tongue and lip, a very natural and effective biting action, and extraordinary resistance to all strains engendered during mastication. Each tooth exhibits to a marked degree all the advantages set forth in the statement of objects at the outset of this specification.

It will be understood that various changes may be resorted to in the form and arrangement of the several portions of the tooth, without departing from the spirit and scope of my invention, and hence I do not intend to be limited to the details herein shown and described, except as they may be included in the claims.

What I claim is:

1. An anterior artificial tooth having substantially complete lingual and labial surfaces and a substantially complete base portion having a base wall extending from the labial gingival to the lingual surface, the labial portion being formed with a substantially vertical inner wall extending inwardly from the mesial and the distal sides and the lingual portion being formed with an incisally inclined inner wall extending from the mesial and distal sides and intersecting said inner labial wall, and the mesial and distal side walls of the base portion tapering inwardly toward said incisal portion from said base wall and intersecting said labial and lingual inner walls, thereby forming an inwardly and incisally tapered recess at each side of the tooth, said recesses being suited readily to receive the flow of the base material of the denture during molding, whereby the tooth is firmly interlocked in the denture by a pair of tapered gripping projections composed of the denture base material.

2. An anterior artificial tooth having substantially complete lingual and labial surfaces and a substantially complete base portion having a base wall extending from the labial gingival to the lingual surface, that portion of the base wall to the rear of the labial portion of the tooth being reduced substantially in width, the labial portion of the tooth being formed with a substantially vertical inner wall extending inwardly from the mesial and the distal sides and the lingual portion of the tooth being formed with an incisally inclined inner wall extending from the lingual gingival toward the incisal edge and from the mesial and distal sides and intersecting said inner labial wall, and the mesial and distal side walls of the base portion tapering inwardly toward said incisal portion from said base wall and intersecting said labial and lingual inner walls, thereby forming an inwardly and incisally tapered recess at each side of the tooth, said recesses being suited readily to receive the flow of the base material of the denture during molding, whereby the tooth is firmly interlocked in the denture by a pair of tapered gripping projections composed of the denture base material.

MERRILL G. SWENSON.